Dec. 21, 1943. J. C. CARLIN 2,337,447
APPARATUS FOR ASSEMBLING TIRE PLIES
Filed Nov. 19, 1940 5 Sheets-Sheet 1
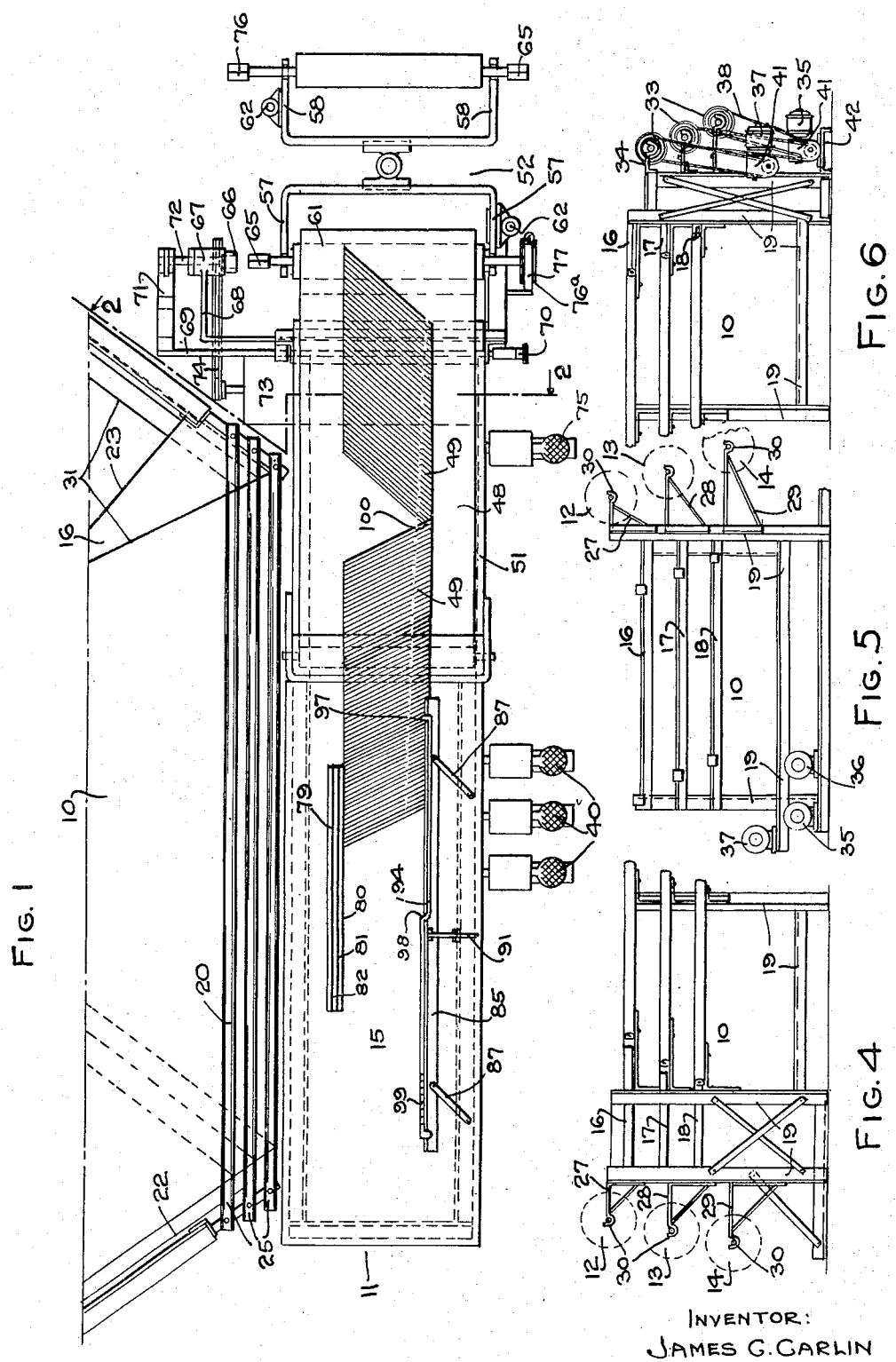
INVENTOR:
JAMES C. CARLIN
By Leon Edelson
ATTORNEY

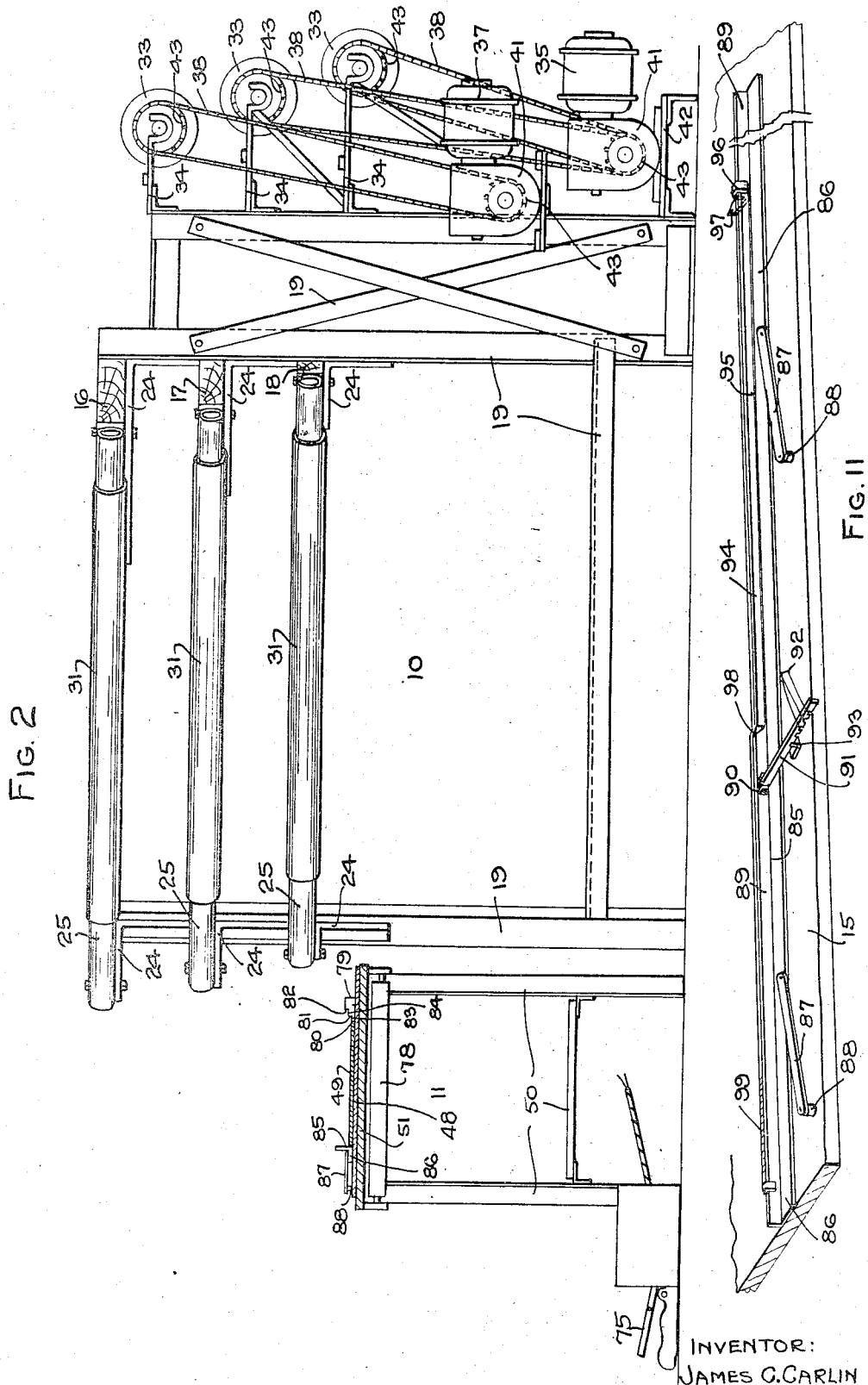

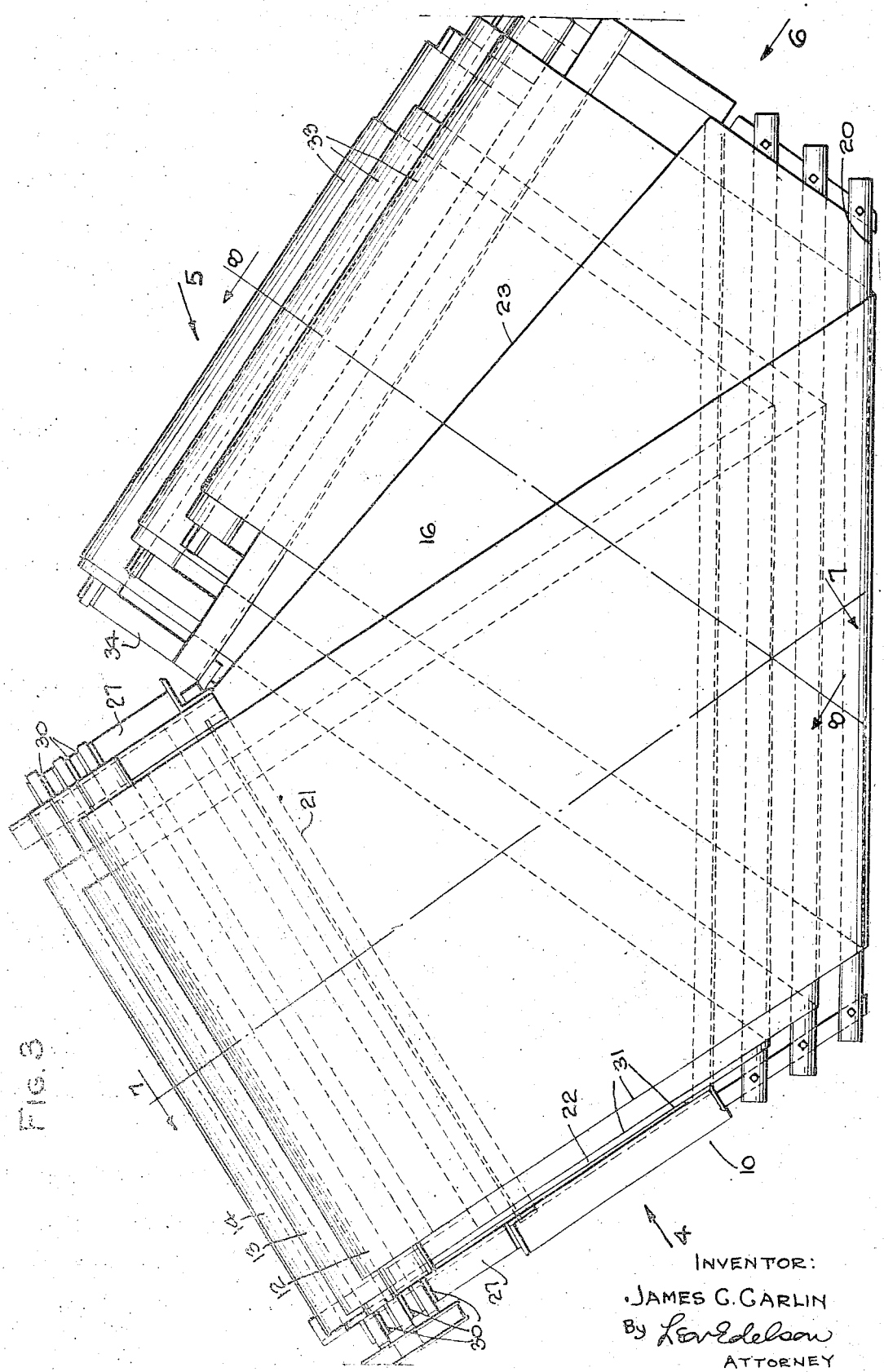

Dec. 21, 1943. J. C. CARLIN 2,337,447
APPARATUS FOR ASSEMBLING TIRE PLIES
Filed Nov. 19, 1940 5 Sheets-Sheet 4

INVENTOR:
JAMES C. CARLIN
By Leo Edelson
ATTORNEY.

Dec. 21, 1943.  J. C. CARLIN  2,337,447
APPARATUS FOR ASSEMBLING TIRE PLIES
Filed Nov. 19, 1940  5 Sheets-Sheet 5

INVENTOR:
JAMES C. CARLIN
By Leon Edelson
ATTORNEY.

Patented Dec. 21, 1943

2,337,447

UNITED STATES PATENT OFFICE 2,337,447

APPARATUS FOR ASSEMBLING TIRE PLIES

James C. Carlin, Norristown, Pa., assignor to Lee Rubber & Tire Corporation, Conshohocken, Pa., a corporation of New York Application November 19, 1940, Serial No. 366,214

19 Claims. (Cl. 154—1)

The present invention relates generally to tire manufacture and more particularly to an apparatus employed therein. It is the object of the present invention to provide an apparatus which will assemble tire fabric strips so that the same may be stored for subsequent use and may be fed to the tire building drum automatically.

In my application, Serial No. 366,216, filed on even date herewith a process is described which greatly facilitates the handling and feeding of cord strips in tire manufacture. This process includes the bias cutting of several webs of corded rubber impregnated tire carcass fabric into strips of different widths. This is done because in the manufacture of a tire carcass several cord fabric plies of different widths are arranged in superposed relation to form a laminated structure. Such bias cut webs are fed to a carrier fabric and wound therewith to form a roll of such carrier fabric with the bias cut web disposed between the convolutions of the roll. Several such rolls are thereafter unwound in a stepwise manner and the strips are removed, a strip at a time, and deposited on a carrier web. The carrier web with the strips adhering thereto is wound into roll form and is subsequently unwound for automatically feeding the strips to a tire building drum. A more detailed description of this process will be found in the above mentioned copending application, the present brief outline of the process being adequate for the further understanding of the present invention.

The apparatus of the present application is designed to facilitate the operation which involves the servicing of the several rolls of bias cut fabric, which respectively contain strips of different widths, the trimming of the strips to the desired length, the selection of strips of different width from the several service rolls in accordance with a predetermined sequence of selection, the assembly of such strips on a carrier web, and the formation of the same into a feed roll which may subsequently be employed for feeding the strips to the tire building apparatus.

It is therefore the object of the present invention to facilitate this operation and to permit the employment of unskilled labor in the performance of this operation.

Another object of the present invention is to provide a gauge for facilitating the endwise trimming of the strips to their desired lengths.

A further object of the present invention is to provide a width gauge which assists in assembling the strips in proper alinement.

Further objects and advantages of the present invention will be apparent to persons skilled in the art from the following description thereof and from the accompanying drawings, it being understood that the present invention consists substantially in the combination, construction, location and relative arrangement of parts, all as will be described more fully hereinafter, as shown in the drawings and as finally pointed out in the appended claims. In the accompanying drawings, which illustrate a preferred embodiment of the present invention and which are not intended to limit in any way the present invention to the particular constructions shown:

In the drawings:

Figure 1 is a plan view of the apparatus with a portion of the apparatus broken away;

Figure 2 is an enlarged view taken on line 2—2 of Figure 1;

Figure 3 is an enlarged plan view of the tire fabric feeding apparatus;

Figure 4 is an elevational view of the apparatus shown in Figure 3 viewed in the direction of arrow 4;

Figure 5 is an elevational view of the apparatus shown in Figure 3 viewed in the direction of arrow 5;

Figure 6 is another elevational view of the apparatus shown in Figure 3 viewed in the direction of arrow 6;

Figure 11 is a detail view of the gauge bar.

Figure 7:
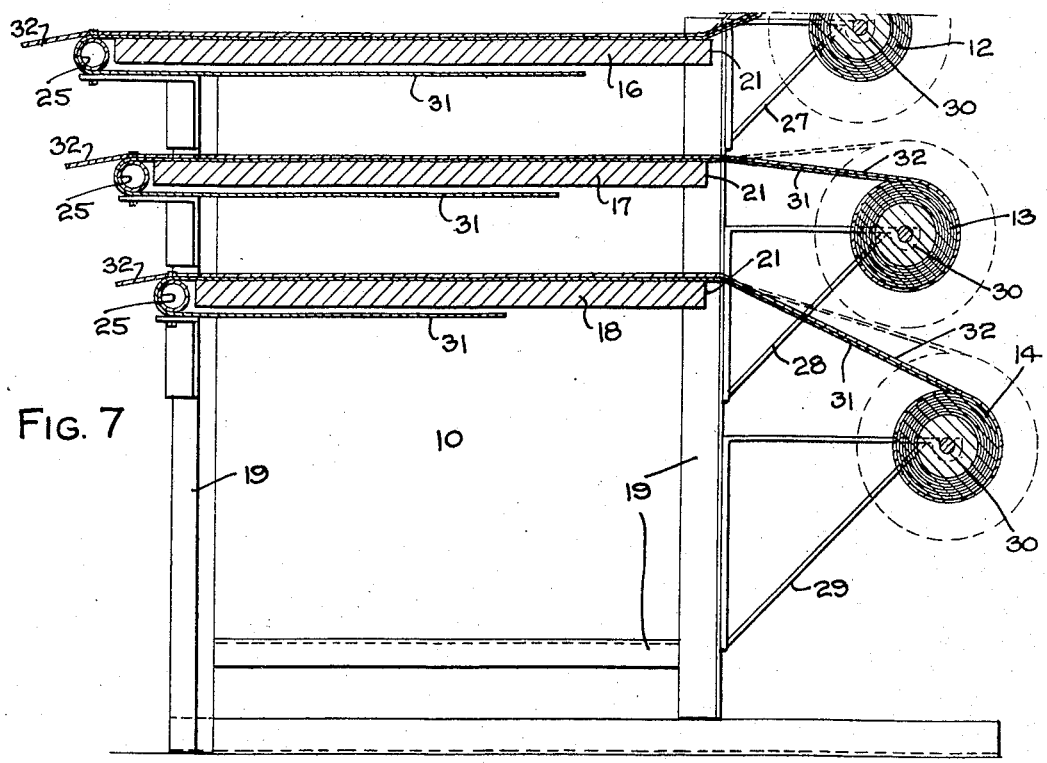
Figure 7 is a vertical sectional view of the feeding apparatus taken on line 7—7 of Figure 3.

The apparatus to which the present application is particularly directed is most comprehensively illustrated in Figures 1 to 6, inclusive, of the drawings, essentially includes a cord fabric servicing unit, designated generally by the reference numeral 10, and an assembling unit, designated generally by the numeral 11, for assembling the cord fabric plies into the form of a roll for subsequent use in the actual building of the tire. The feeding unit 10 supports the several rolls 12, 13 and 14 of bias cut tire fabric, and feeds bias cut webs of tire fabric so as to permit the operator to remove individual strips therefrom and deposit the same on the table 15 of the assembling unit 11 disposed in front of the servicing apparatus 10. The operator is stationed in front of the table 15, controls the stepwise feeding of the rolls 12, 13 and 14, removes the strips of fabric, one strip at a time, and then trims one or both ends of each strip to the desired length, and deposits the same on the table 15 so as to form a feed roll in which the strips are so disposed that the same may be automatically fed to a tire building drum. The apparatus for automatically feeding the roll of strips so formed to the tire building drum is described and claimed in another application, Serial No. 366,215, filed on even date herewith.

The servicing unit 10 comprises a plurality of vertically spaced platforms 16, 17 and 18 supported by a framework 19. The shape of these platforms may be best observed in the plan view shown in Figure 3 in which the full shape of the uppermost platform 16 may be observed. It will be seen that its front or delivery edge 20 is angularly disposed with relation to the rear edge 21; the angular relationship being such that when the bias cut web of fabric is being fed thereover the bias cut lines of the fabric will approximately parallel the front edge 20 of the platform. One lateral edge 22 of the platform is substantially perpendicular to the rear edge 21 while the other lateral edge 23 thereof is preferably angularly disposed so as to provide a portion which extends away from the feeding surface of the table to provide a lateral guiding edge under which is fed the carrier fabric which travels on the under face of each platform. The frame also supports by means of angle irons 24 or the like a rod or pipe 25 at the front edge of each platform. These rods or pipes 25 may take the form of loosely mounted sleeves which rotate on suitable journals therefor as the material is being fed thereunder.

A series of vertically spaced pairs of brackets 27, 28 and 29 are mounted on the rear of the frame 19, each of the brackets being provided with a pair of stationary bearings 30 for receiving and supporting the rolls 12, 13 and 14, with their axes substantially parallel to the rear edges 21 of the several platforms and to permit the feeding of the carrier fabrics of such rolls together with the bias cut webs of tire fabric over the platforms 16, 17 and 18 respectively. The rolls 12, 13 and 14, which are thus mounted for rotation behind the platforms 16, 17 and 18, each comprise a wound-up carrier fabric 31 and a bias cut web of tire fabric 32 substantially coextensive with the carrier fabric. The web of tire fabric 32 need not be of the same width as the carrier fabric 31 and is generally somewhat narrower than the width of the carrier fabric; it, however, extends over substantially the entire length of the carrier fabric almost from end to end and is disposed between the convolutions of the carrier fabric. Each roll 12, 13 or 14 therefore carries or supports a great number of tire fabric strips. By reason of the tackiness of the rubber in such fabric these strips tend slightly to adhere to each other along the cut edges so that they may be spoken of as constituting a web of tire fabric disposed between the convolutions of the carrier fabric. When such rolls are prepared a substantial length of carrier fabric 31 is left at the end of each roll merely for wrapping the roll and to protect the tire fabric 32 against possible injury during storage and transportation of such rolls.

When a roll is mounted on its supporting brackets, the uncovered portion of the carrier web 31 is drawn over the top surface of the corresponding platform, thence over the rod 25 at the front edge of the platform, and then under the platform in a direction towards the edge 23 of the platform. By reason of the angular relationship between the bar or rod 25 and the axes of the rolls, the bias cut strips will approach the forward edge of each platform with their longitudinal edges approximately parallel to such forward edges. The carrier web 31, divested of the tire fabric 32, turns in the direction of and moves to the lateral edge 23 and is there rolled onto receiving rolls 33 which are suitably supported by pairs of brackets 34. The receiving rolls 33 will be seen to be supported angularly with relation to the rolls 12, 13 and 14. Thus as the carrier web of each roll is drawn over the upper face of its supporting platform and under the lower face thereof and wound on the receiving rolls 33, the strips of tire fabric are made available at the front edges of the several platforms.

Figure 8:
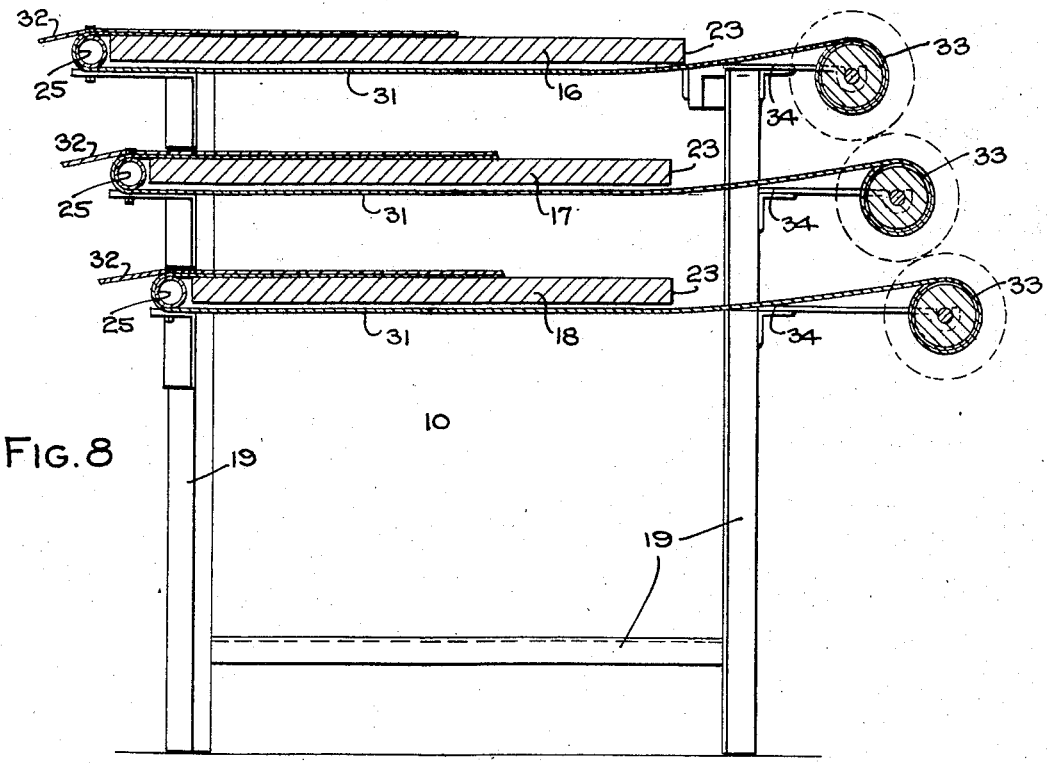
Figure 8 is another vertical sectional view of the feeding apparatus taken on line 8—8 of Figure 3.

In order to facilitate the removal of such strips from such front edges of the platforms 16, 17 and 18 and to prevent the strips of one web from contacting the strips of the web below as they are being withdrawn, the front edges of the platforms are preferably disposed below and behind each other as best shown in Figures 7 and 8. Similarly for the purpose of facilitating the removal and replacement of any of these rolls the pairs of brackets 27, 28 and 29 are vertically and laterally spaced as shown in Figure 7, the supporting brackets 34 for the carrier fabric receiving rolls 33 being similarly mounted in vertically spaced and laterally offset relation.

The rolls and fabrics may be drawn and fed over the platforms by any suitable motor power and by means of a large variety of suitable devices. In the preferred form of the present invention each of the webs is fed independently of the others by its own source of motor power. For this purpose three electric motors 35, 36 and 37 are mounted below and adjacent to corresponding ends of the receiving rolls 33, thus providing a motor for each receiving roll. The power of each of these motors is transmitted to its respective receiving roll by means of chains and sprocket wheels designated generally by reference character 38. Thus when power is applied to one of these motors the corresponding receiving roll 33 is rotated and the carrier web 31 is drawn thereon, thus unwinding the same from the corresponding loaded roll 12, 13 or 14 and bringing the tire fabric strips successively toward the forward edge of their respective platforms, thus permitting the ready removal of such strips from the web while the carrier fabric 31 is being wound on its receiving roll 33.

In order to permit of the ready control and feeding of the webs from each of the loaded rolls 12, 13 or 14, the apparatus includes three foot-operated switches 40, one for each of the motors 35, 36 and 37. By selective operation of the switches 40 the operator controls the feeding and stopping of the webs from the filled rolls 12, 13 and 14. This also permits the operator to feed these materials or rolls in any desirable order and when necessary it also permits him to feed and remove two or more strips from any one of the webs in succession, depending upon the type of tire which is being manufactured and depending upon the desired number of strips of any width which go into the manufacture of the particular tire.

In this connection, it will be noted that the several supply or servicing rolls 12, 13 and 14 are respectively loaded with tire fabric bias cut to provide cord plies or strips of different width, each roll containing plies or strips of uniform width. While this is the preferred practice, in certain instances it may be desirable to load each servicing roll with tire fabric which has been bias cut to provide cord plies or strips of different widths arranged in predetermined sequence.

Each motor 35, 36 and 37 with its associated reduction gear box 41 is fixedly mounted in position, as, for example, on the bases or platforms 42 as shown. Each sprocket chain is associated with each of these gear boxes and the opposed end of each sprocket chain is associated with a sprocket wheel 43 which is readily removable from and may be readily mounted on a squared end of the shaft of the corresponding roll. By this device the removal or replacement of the rolls 33 is greatly facilitated. After a roll 33 has been filled with carrier fabric, sprocket wheel 43 is removed, the roll is removed and an empty roll is replaced in the bracket and the sprocket wheel 43 is then mounted on the new empty roll so as to permit transmission of power thereto.

Figure 9:
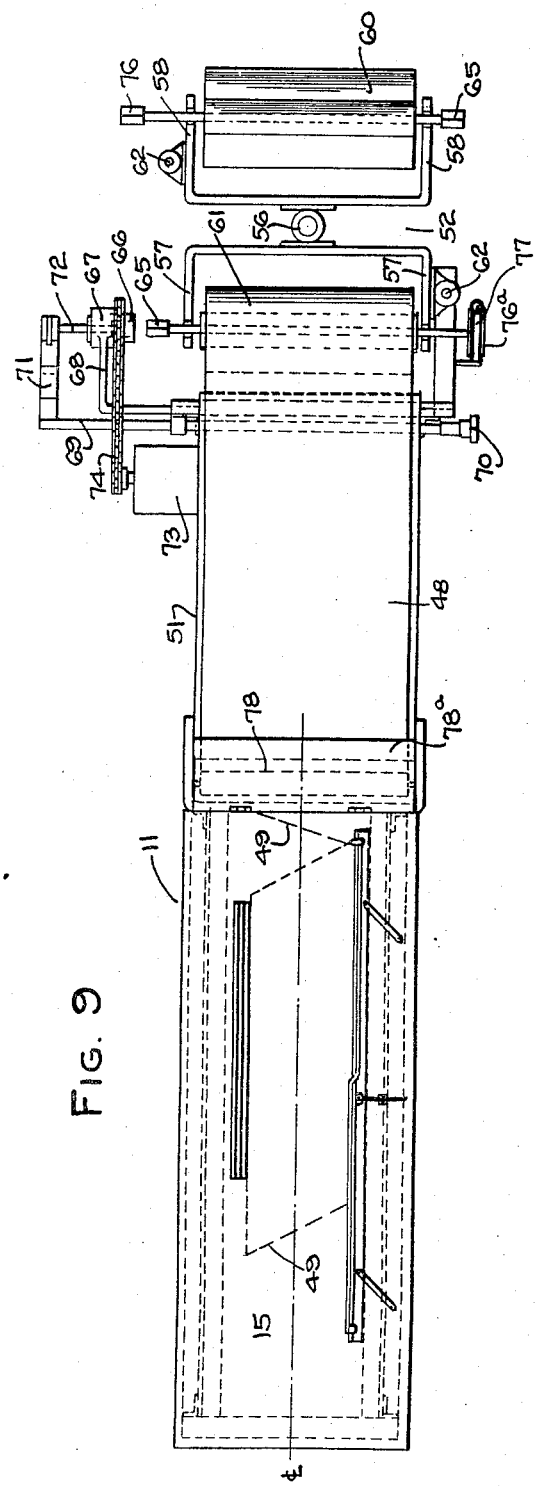
Figure 9 is a plan view of the measuring table and feed roll forming apparatus.
Figure 10:
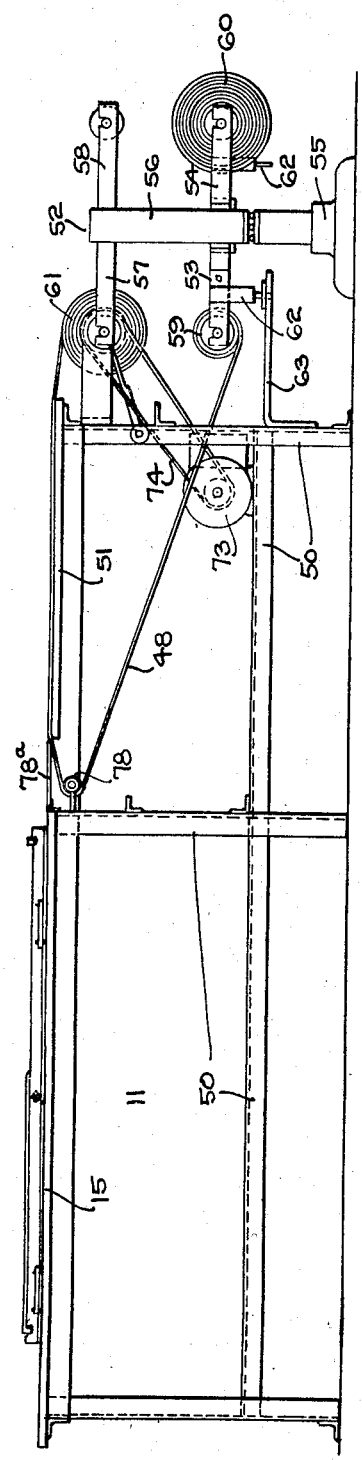
Figure 10 is a vertical view of the same apparatus.

The assembling unit, which is generally indicated by the reference character 11 in Figure 1, is illustrated in greater detail in Figures 9, 10 and 11 and part of it is shown in section in Figure 2. This unit is disposed immediately in front of the cord fabric discharge edge of the servicing unit 10 and is disposed generally longitudinally of such edge. The operating level of the table 15 of the assembling unit is also considerably below the level of the cord fabric servicing platforms of the servicing unit 10. Thus the operator stands in front of the table 15 and, by the proper operation of the foot-operated switches 40, causes the plies or strips of different widths to be fed towards him selectively and in proper sequence. The general aim of the entire apparatus, as has already been set forth previously, is to facilitate the assembly of the tire fabric plies or strips into longitudinally alined groups which will permit the subsequent automatic feeding of such plies or strips to a tire building drum. The length of the bias cut strips as they are fed off the rolls or platforms are all approximately the same, although the strips coming from the different webs vary from each other in width. In actual use, however, the strips have to be trimmed to their proper lengths because as the strips are mounted on the tire building drum, the circumference of the drum increases, thereby necessitating a longer strip. The assembling unit 11 therefore includes devices which guide or assist the operator in trimming one or both ends of each strip to the desired length and in addition the unit 11 includes means and devices which provide for the proper alinement of the plies or strips with each other so that when they are wound into the feeding roll together with the carrier web, the longitudinal center lines of the plies or strips are all in substantial alinement.

The assembling unit 11, therefore, comprises a frame 50, which supports, in addition to the table 15, a second table 51, the latter being in effect a continuation of the table 15. In addition, the unit 11 includes a winding device 52, which is provided with two pairs of oppositely projecting brackets 53 and 54 for supporting two rolls of carrier fabric 48, so that the carrier fabric 48 upon such rolls may be fed to and over the table 51 to receive the tire strips 49 in proper assembly while the fabric and tire strips are rewound on another take-up roll. This winding device 52 operates turret-like so that as soon as one roll of carrier fabric is loaded with tire strips, it may be rotated to place a second empty roll of carrier fabric in position to accept a new series of cord fabric plies or strips, all without any substantial interruption in the operation of preparing the rolls of such plies.

The turret device 52 comprises a stationary base 55 and a rotating standard 56 supported thereon. The rotating standard 56 carries on each side thereof in addition to the lower set of brackets 53 and 54, an upper set of brackets 57 and 58. The lower pairs of brackets 53 and 54 receive and support the rolls of carrier fabric 59 and 60. As soon as one such roll, such as 59, is exhausted by winding it with the tire strips so as to form a completed feeding roll 61, standard 56 is rotated so as to render the roll of carrier fabric 60 available for feeding over the table 51. Completed roll 61 is thereafter, and while roll 60 is being operated upon, removed, the idle core of the roll 59 is substituted in its place, and a new unloaded roll of carrier fabric is deposited in the empty brackets 54.

One of each pair of brackets 54 is provided with a downwardly projecting stop member 62 which is engaged by an opening in the spring member 63 carried by the frame 52, thus maintaining standard 56 and the brackets carried thereby in fixed position and minimizing any vibration or oscillation of this organization.

The cores of the rolls each have a square end 65 (see Figure 9) for engagement with a correspondingly shaped recess in the rotatable journal 66 which is carried by the collar 67 disposed at the end of the bracket 68. The journal 66 is slidable within the collar 67 by means of the slidable rod 69 which is supported on frame 52 and may be slid by the manual knob 70 within reach of the operator. Rod 69 carries arm 71 and the stub 72. The end of stub 72 is rotatably attached to the journal 66. Motor 73 is supported by the frame 52 and power is transmitted therefrom to the journal 66 by the sprocket chain 74 and suitable sprocket wheels. Of course, any suitable clutch mechanism may be employed for facilitating engagement and disengagement of the core of the roll 61 with respect to the shaft driven by the motor 73.

When the standard 56 is rotated so as to place a fresh roll of carrier fabric in operative position, that is, into the position occupied by roll 59 in Figure 10, fabric 48 thereof is drawn over idler 78 thence threaded through the space between the tables 15 and 51, thence over the table 51 and finally onto the receiving roll 61 carried by the brackets 57 on the turret device 52. The operator then pulls on the knob 70 so as to bring the journal 66 into enagement with the square end 65 of the receiving roll. Thereafter the operation of the motor is controlled by the operator through the foot-operated electric switch 75. The end of the roll 61 opposed to the square shaft 65 is also squared, as at 76, and receives a part 76a cooperating with any desirable brake or retarding device 77, thereby assisting in instantaneous stopping of such rolls immediately upon opening or release of the switch 75. If desired, a similar retarding device may be provided for the fabric supply roll 59, or it may be supplied solely to the latter.

The space between the tables 15 and 51 through which the carrier fabric is threaded is preferably closed by a suitably hinged gate 78a which lies substantially in the common plane of the tables 15 and 51.

The table 15 is provided with a gauge which is designed to guide the operator in trimming the length of each strip properly and in addition devices are provided on the table 15 which assist the operator in the longitudinal alinement of the strips. For this purpose table 15 supports a bar 79 in fixed position adjacent the inner edge of the table, this bar being stepped to provide several width gauging surfaces. For the narrowest desired width the front vertical face 80 of the strip is employed. For wider widths the several vertical gauging surfaces 81 and 82 are employed, the corresponding horizontal surfaces 83 and 84 serving to support the marginal edges of the wider strips.

In addition the table 15 supports a movable bar 85, which is preferably in the form of an angle iron, thus providing a horizontal flange 86 serving as a base for the movable bar 85. The flange 86 carries a pair of parallel links 87, one end of each link being pivotally attached to the flange 86 while the other end of each link 87 is pivotally fixed to the face of the table as at 88. In addition the vertical flange 89 of the bar 85 has pivoted thereto, as at 90, a notched lever 91 provided with notches 92 on its lower edge for engagement with an upwardly directed lug 93 carried by the table.

The bar 85 is movable to any one of several positions depending upon the particular notch which is in engagement with the lug 93. The parallel links 87 serve to maintain the bar 85 generally in a position parallel to the width gauging surfaces 80, 81 and 82 of the bar 79 throughout all movement of said bar. Thus, it will be understood that the operator when handling the narrowest strip will first position the bar 85 by pushing it forward until the proper notch is in engagement with the lug 93. In this position the distance between the bar 85 and the first vertical face 80 of the fixed gauge bar 79 corresponds to the width of the narrowest strip. The operator thereupon moves the strip from the discharge edge of the corresponding platform which feeds the narrowest strips and after trimming it to length, places the strip on the table 15 so that its longitudinal edges are substantially in engagement with the vertical flange 89 of the bar 85 and with the face 80 of the gauge bar 79. He may either place the strip on the table 15 in such a manner that one end of the strip directly overlaps onto the carrier fabric 48 on table 51 or he may draw this strip onto table 15 so as to cause the forward end thereof to overlap onto table 51 and then while drawing the strip onto the carrier fabric, he may positionally adjust it for proper guidance between the gauge bars.

Thereafter, the operator operates the switch 75 so as to cause the carrier web 48 to be drawn over the table 51 together with the tire strip or ply. Similarly the operator, by moving the lever 91 for engagement of other notches with the lug 93 at the same time that he employs one or the other of the remaining faces 81 or 82 of the fixed gauge bar 79, may properly position strips of different width in order to insure coincidence of the longitudinal center lines of all of the successively arranged strips. To this end, the spacing between the notches 92 on the lever 91 corresponds to that between the corresponding vertical gauging faces 80, 81 and 82. This width gauge therefore serves to guide each strip so that its longitudinal edges are maintained parallel to the edges of the carrier web 48 and the center lines of all strips are maintained in substantial alinement.

In order to assist the operator in trimming each strip to its own required length, the bar 85 is provided with a slidable length gauge 94. This gauge is made of flat metal and includes a portion 95 disposed along the outer face of the bar 85. One end of the gauge 94 has a portion 96 which is bent over the top of the bar 85 and is provided with a pointer 97. The intermediate portion of the gauge is similarly provided with a yoke-like portion 98 which bends over the top of bar 85, to thereby dispose the opposite end portion of the length gauge interiorly of the width gauge bar 85, this latter portion having a graduated scale 99.

In operating, the operator removes a strip from the servicing platform and deposits it on table 50. He then slides the length gauge 94 so that the pointer 97 is in alinement with the near and trimmed corner at one end of the strip. The scale 99 then indicates the point at which the other end of the strip needs to be trimmed. It should be remembered that the tire fabric in substance consists of cords which run parallel to the ends of the strip and which are bound together by uncured rubber. It thus is a relatively simple operation to remove any excessive amount of fabric by merely gripping the fabric at the desired point and tearing off the remainder, the cords serving as guides for the tear. The slidable length gauge 94 facilitates this operation for it is a much more simple operation to slide the gauge 94 an inch or two than to move the strip in alinement with the gauge.

While the manner in which the present apparatus is employed is more or less clear, the following is a more detailed description of the use and function of the apparatus. Prior to the functioning of the present apparatus, a series of rolls of tire fabric had been prepared. These rolls each comprise any suitable textile material serving as a carrier fabric and serving also to separate successive layers or convolutions of tire fabric from each other. The tire fabric in the roll may be spoken of as in web form but has been bias cut without separating the strips each from the other in the sense that they were deposited on the carrier fabric so as to maintain the continuity of the web. The lengths of the strips of tire fabric are all about the same and correspond to the width of the web. The width of the strips however varies from roll to roll depending upon the needs of the tire. In the manufacture of four and six ply fabric it is found that three different widths of strips are needed. The present apparatus therefore is designed to receive three rolls of bias cut tire fabric the cut strips in each having a different width. The present apparatus is further designed to give the operator close control of the feeding of these tire fabric strips. It also facilitates the trimming operation. The apparatus also provides for the assembly of the strips so that each group includes the requisite number of strips and in the order in which they are to be fed to the tire building drum.

The three rolls of tire fabric are mounted at the loading end of the feeding apparatus as indicated by reference characters 12, 13 and 14. In starting the operation of the machine the excess of carrier fabric is drawn over the platforms 16, 17 and 18 and the fabric is rolled onto the then empty rolls 33 at the receiving side of each platform. The operator selectively operates the pedal switches 40 so as to feed the strips intermittently a strip at a time. The operator removes the strips successively from the platforms, deposits them upon the table 15 after he has previously adjusted the laterally shiftable width bar 85 to correspond to the width of the strip, and trims them to length by the aid of the length gauge 94. In depositing the strips on the table 15 the operator takes care that the ends of adjacent strips are disposed angularly to each other and in addition that the corners overlap as shown at 100 in Figure 1.

The strips are drawn off the table 15 successively by the movement of the carrier web 48, the movement being controlled by the operation of the switch 75. When the roll of carrier fabric 53 is exhausted, the knob 70 is manipulated to disengage the journal 66 from the end 65, the brake and brake drum 76 are removed, 63 is disengaged from the stop 62, and the standard 56 is rotated. The second stop 62 is engaged by 63; the new fabric is drawn over the table 51 and over the core 64, and by pulling on knob 70, the journal 66 is coupled to the core 64. The proper feeding and assembly of the strips is now resumed.

The pedal switches 40 and 75 are preferably of the type in which the switch is closed as long as it is depressed by the operator's foot and is opened by the removal of the operator's foot therefrom. This permits of the accurate control of the operation of all of the take-up rolls and the entire apparatus is always under close control.

I claim:

1. An apparatus for assembling tire strips into a continuous roll for the subsequent feeding of the same to a tire building drum, said apparatus comprising a plurality of spaced superposed platforms, means for feeding over each platform a web of tire fabric bias cut into strips of different widths, individual motor means controlling the feed of each web, a relatively long and narrow receiving table disposed longitudinally of the front of said feed platforms for receiving the strips from said feed platforms, and a travelling web of carrier fabric disposed in alinement with said receiving table withdrawing the strips successively from said receiving table.

2. An apparatus for assembling tire strips into a continuous roll for the subsequent feeding of the same to a tire building drum, said apparatus comprising a plurality of spaced superposed platforms, means for feeding over each platform a web of tire fabric bias cut into strips of different widths, individual motor means controlling the feed of each web, a relatively long and narrow receiving table disposed longitudinally of the front of said feed platforms for receiving the strips from said feed platforms, a travelling web of carrier fabric disposed in alinement with said receiving table withdrawing the strips successively from said receiving table, and a guide on said receiving table for maintaining said strips in alinement on said web.

3. An apparatus for assembling tire strips into a continuous roll for the subsequent feeding of the same to a tire building drum, said apparatus comprising a plurality of spaced superposed platforms, means for feeding over each table a web of tire fabric bias cut into strips of different widths, individual motor means controlling the feed of each web, a relatively long and narrow receiving platform disposed longitudinally of the front of said feed platforms for receiving the strips from said feed platforms, a travelling web of carrier fabric disposed in alinement with said receiving table withdrawing the strips successively from said receiving table, and a guide on said receiving table for maintaining said strips in alinement on said web, said guide comprising a transversely movable element for adjusting the guide to the several widths of strips.

4. An apparatus for assembling tire strips into a continuous roll for the subsequent feeding of the same to a tire building drum, said apparatus comprising a plurality of spaced superposed platforms, means for feeding over each platform a web of tire fabric bias cut into strips of different widths, individual motor means controlling the feed of each web, a relatively long and narrow receiving table disposed longitudinally of the front of said feed platform for receiving the strips from said feed platform, a travelling web of carrier fabric disposed in alinement with said receiving table withdrawing the strips successively from said receiving table, and motor means for winding said carrier web and strips into a roll.

5. An apparatus for assembling tire strips into a continuous roll for the subsequent feeding of the same to a tire building drum, said apparatus comprising a plurality of spaced superposed platforms, means for feeding over each platform a web of tire fabric bias cut into strips of different widths, individual motor means controlling the feed of each web, a relatively long and narrow receiving table disposed longitudinally of the front of said feed platforms for receiving the strips from said feed platforms, a travelling web of carrier fabric disposed in alinement with said receiving table withdrawing the strips successively from said receiving table, motor means for winding said carrier web and strips into a roll, and a series of foot-operated switches disposed in front of said table for the intermittent control and operation of each of said motor means.

6. An apparatus for assembling tire strips into a continuous roll for the subsequent feeding of the same to a tire building drum, said apparatus comprising a plurality of spaced superposed platforms, means for feeding over each platform a web of tire fabric bias cut into strips of different widths, individual motor means controlling the feed of each web, a relatively long and narrow receiving table disposed longitudinally of the front of said feed platforms for receiving the strips from said feed platforms, a travelling web of carrier fabric disposed in alinement with said receiving table withdrawing the strips successively from said receiving table, a guide capable of adjustment to the several widths of the strips for establishing substantial alinement of the longitudinal center lines of adjacent strips as they are carried away by the carrier web, and motor means for winding said carrier web and strips into a roll.

7. An apparatus for assembling tire strips into a continuous roll for the subsequent feeding of the same to a tire building drum, said apparatus comprising a plurality of spaced superposed platforms, means for feeding over each platform a web of tire fabric bias cut into strips of different widths, individual motor means controlling the feed of each web, a relatively long and narrow receiving table disposed longitudinally of the front of said feed platforms for receiving the strips from said feed platforms, a travelling web of carrier fabric disposed in alinement with said receiving table withdrawing the strips successively from said receiving table, a guide capable of adjustment to the several widths of the strips for establishing substantial alinement of the longitudinal center lines of adjacent strips as they are carried away by the carrier web, motor means for winding said carrier web and strips into a roll, and a pedal switch for each of said motor means permitting intermittent control and operation of each of said motor means.

8. An apparatus for feeding several webs of bias cut tire fabric supported by a carrier fabric comprising a supporting frame, a plurality of spaced superposed feed platforms supported by said frame, each platform having a rear loading edge, a front feeding edge, and a lateral receiving edge; a pair of loading brackets mounted on said frame adjacent each loading edge for receiving a roll of a bias cut web of tire fabric supported by a carrier fabric, another pair of brackets mounted on said frame adjacent each receiving edge for rotatably supporting rolls upon which are received and wound the carrier fabric after the strips have been removed therefrom, and individual motor means for effecting rotation of the receiving rolls for the carrier fabric.

9. An apparatus for feeding several webs of bias cut tire fabric supported by a carrier fabric comprising a supporting frame, a plurality of spaced superposed feed platforms supported by said frame, each platform having a rear loading edge, a front feeding edge, and a lateral receiving edge; a pair of loading brackets mounted on said frame adjacent each loading edge for receiving a roll of a bias cut web of tire fabric supported by a carrier fabric, and another pair of brackets mounted on said frame adjacent each receiving edge for receiving and winding the carrier fabric after the strips have been removed therefrom, the feeding edges of said platforms being disposed angularly relative to the brackets and the rolls supported thereby.

10. An apparatus for feeding several webs of bias cut tire fabric supported by a carrier fabric comprising a supporting frame, a plurality of spaced superposed feed platforms supported by said frame, each platform having a rear loading edge, a front feeding edge, and a lateral receiving edge; a pair of loading brackets mounted on said frame adjacent each loading edge for receiving a roll of a bias cut web of tire fabric supported by a carrier fabric, and another pair of brackets mounted on said frame adjacent each receiving edge for receiving and winding the carrier fabric after the strips have been removed therefrom, the feeding edges of said platforms being disposed angularly relative to the brackets and the rolls supported thereby and rearwardly of the feeding edge of the overlying platform.

11. An apparatus for feeding several webs of bias cut tire fabric supported by a carrier fabric comprising a supporting frame, a plurality of spaced superposed feed platforms supported by said frame, each platform having a rear loading edge, a front feeding edge, and a lateral receiving edge; a pair of loading brackets mounted on said frame adjacent each loading edge for receiving a roll of a bias cut web of tire fabric supported by a carrier fabric, a roll journalled on said frame adjacent each receiving edge for receiving and winding the carrier fabric after the strips had been removed therefrom; the feeding edges of said platforms being disposed angularly relative to the brackets and the rolls supported thereby, and rearwardly of the feeding edge of the overlying platform, a motor for each of said carrier fabric receiving rolls, and power transmitting means connected to said motor and detachably associated with each of said carrier fabric receiving rolls.

12. An apparatus for assembling tire strips into a continuous roll for the subsequent feeding of the same to a tire building drum, said apparatus comprising means for rotatably supporting a roll of a carrier web, means for rotatably supporting a take-up roll, a table supporting said carrier web in its travel from the first roll to the take-up roll, and means for feeding tire fabric strips to said carrier web comprising a second table, guide means on said table for guiding said tire strips to the carrier web in longitudinal alinement, said guide means comprising a fixed longitudinally disposed bar having several vertical guiding surfaces, a second bar parallel to the first bar, a pair of parallel links pivotally fixed at one end to the table and at the other end to the second bar, a notched lever pivoted to the bar, and a lug fixed on the table for engagement with the notched lever.

13. In an apparatus for assembling tire carcass plies into a continuous roll for the subsequent feeding of the same to a tire building drum, a servicing platform for said plies disposed in a substantially horizontal plane having freely disposed rear and front edges, means for supporting adjacent the rear edge of said platform a pre-formed roll of tire fabric bias cut into plies of requisite width and composed of a carrier web between the convolutions of which is wound said tire fabric, means for drawing said carrier web and the tire fabric overlying the same flatwise over said platform, and means for effecting separation of said tire fabric from said web at the front edge of said platform by drawing the carrier web under said platform and in a direction laterally of the path of movement of the tire fabric over said platform.

14. In an apparatus as defined in claim 13 wherein said delivery edge of the platform is angularly related to said first-mentioned edge thereof and parallels the longitudinal center lines of the bias cut plies of said fabric.

15. In an apparatus for assembling tire carcass plies into a continuous roll, a platform for servicing a succession of bias cut strips of tire fabric superposed and supported upon a continuous web of carrier fabric, said platform being disposed substantially in a horizontal plane and having angularly related front, rear and side edges, means at the read edge of said platform for supporting in feeding relation to said platform a supply of carrier web and tire fabric superposed thereon, means at one side edge of said platform for taking up said carrier web as it travels over said platform and is divested of said tire fabric, and means at the front edge of said platform for insuring travel of said carrier web about said front edge toward the web take-up means, said front edge of the platform being disposed substantially parallel to the longitudinal center lines of said bias cut strips.

16. In an apparatus for assembling tire carcass plies into a continuous roll for the subsequent feeding of the same to a tire building drum, a servicing platform disposed in a substantially horizontal plane for receiving upon the upper surface thereof a plurality of successive bias cut plies disposed with their lines of severance substantially parallel, and means for feeding a carrier web for said plies above said platform in one direction and thence beneath said platform in a direction angularly related to said first direction, said carrier fabric being adapted to be divested of said plies successively at the line approximately where said web reverses in its direction of travel, said line being substantially coincident with the front edge of said platform.

17. In an apparatus as defined in claim 16 wherein said front edge of the platform is disposed substantially parallel to the longitudinal center lines of said plies.

18. In an apparatus as defined in claim 16 including means for progressively feeding said carrier web to successively present said plies in position adjacent the front edge of said platform to be individually removed from said carrier web.

19. In an apparatus for assembling tire carcass plies preliminarily arranged with their longitudinal center lines in substantial parallelism into an arrangement wherein said plies are arranged lengthwise of each other with their longitudinal center lines in substantial coincidence, a servicing unit therefor including a plurality of horizontally disposed platforms arranged in vertically spaced relation, means for supporting adjacent one edge of each of said platforms a preformed supply of said plies in the form of a continuous web of tire fabric bias cut to provide separate plies arranged in side edge to side edge relation, said supply of tire fabric including a continuous carrier web therefor, means for respectively drawing said carrier webs and their supported tire fabrics respectively over said platforms, means for effecting separation of the tire fabric plies from a supporting web carrier therefor along a free edge of said platform paralleling the longitudinal center lines of the bias cut plies of said fabric, and means for selectively controlling the feed of said carrier webs over said platforms whereby the same may be selectively divested of plies from one or more of said supporting webs in accordance with a predetermined sequence of selection.

JAMES C. CARLIN.